United States Patent
Endoh

(10) Patent No.: US 7,509,217 B2
(45) Date of Patent: Mar. 24, 2009

(54) VEHICLE DETECTOR AND VEHICLE DETECTING METHOD

(75) Inventor: Kenjiro Endoh, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 156 days.

(21) Appl. No.: 11/249,153

(22) Filed: Oct. 11, 2005

(65) Prior Publication Data

US 2006/0089799 A1   Apr. 27, 2006

(30) Foreign Application Priority Data

Oct. 21, 2004   (JP) .......................... 2004-306489

(51) Int. Cl.
*G06G 7/78* (2006.01)

(52) U.S. Cl. ................. 701/300; 701/223; 701/17; 342/13; 342/17; 342/25 R; 342/42; 342/51; 342/70; 342/73; 342/118; 342/160; 342/161; 342/165; 342/357; 342/454; 342/455; 342/457; 180/167; 180/168; 180/169; 303/193; 432/2; 432/6

(58) Field of Classification Search ......... 701/300–302, 701/223, 17; 342/13, 17, 25 R, 42, 51, 70, 342/73, 118, 160, 161, 165, 357, 454, 455, 342/457; 180/167, 168, 169; 340/435; 303/193; 432/2, 6

See application file for complete search history.

(56) References Cited

U.S. PATENT DOCUMENTS

| | | | | |
|---|---|---|---|---|
| 4,475,238 A * | 10/1984 | Everhart | ..................... | 382/218 |
| 4,891,762 A * | 1/1990 | Chotiros | ..................... | 701/223 |
| 5,343,206 A * | 8/1994 | Ansaldi et al. | ................ | 342/70 |
| 5,529,139 A * | 6/1996 | Kurahashi et al. | ........... | 180/169 |
| 5,612,699 A * | 3/1997 | Yamada | ...................... | 342/70 |
| 5,648,905 A * | 7/1997 | Izumi et al. | ................. | 701/301 |
| 5,689,264 A * | 11/1997 | Ishikawa et al. | .............. | 342/70 |
| 5,739,848 A * | 4/1998 | Shimoura et al. | ........... | 348/119 |
| 5,745,070 A * | 4/1998 | Yamada | ...................... | 342/70 |
| 5,806,019 A * | 9/1998 | Ishiyama | .................... | 701/300 |
| 5,926,117 A * | 7/1999 | Gunji et al. | ................. | 340/988 |
| 5,955,967 A * | 9/1999 | Yamada | ..................... | 340/904 |
| 6,119,067 A * | 9/2000 | Kikuchi | ...................... | 701/300 |
| 6,223,117 B1 * | 4/2001 | Labuhn et al. | ................ | 701/93 |
| 6,631,324 B2 * | 10/2003 | Okamura et al. | ........... | 701/301 |
| 6,675,094 B2 * | 1/2004 | Russell et al. | .............. | 701/301 |
| 6,888,622 B2 * | 5/2005 | Shimomura | ................ | 356/4.01 |
| 7,463,182 B1 * | 12/2008 | Morinaga et al. | ............ | 342/28 |
| 2001/0026238 A1 * | 10/2001 | Shirai et al. | .................. | 342/70 |
| 2002/0107637 A1 * | 8/2002 | Okamura et al. | ........... | 701/301 |
| 2003/0173127 A1 * | 9/2003 | Noecker | .................... | 180/167 |
| 2003/0174054 A1 * | 9/2003 | Shimomura | ................ | 340/435 |
| 2004/0090319 A1 * | 5/2004 | Kimura et al. | ............. | 340/435 |
| 2005/0093735 A1 * | 5/2005 | Samukawa et al. | ........... | 342/70 |
| 2005/0122251 A1 * | 6/2005 | Shimomura | ................ | 342/70 |

(Continued)

*Primary Examiner*—Khoi Tran
*Assistant Examiner*—Jorge O Peche
(74) *Attorney, Agent, or Firm*—Brinks Hofer Gilson & Lione

(57) ABSTRACT

A vehicle detector includes a detecting apparatus and a determining apparatus. If a plurality of detection points detected by the detecting apparatus forms a group of detection points, the determining apparatus sets a determining virtual window encompassing the group of detection points and determines whether the group of detection points is likely to represent the one vehicle based on a state of movement of the group of detection points with respect to the determining virtual window.

19 Claims, 5 Drawing Sheets

U.S. PATENT DOCUMENTS

2005/0174282 A1* 8/2005 Nakanishi et al. ........... 342/109
2005/0240330 A1* 10/2005 Heinrichs-Bartscher ...... 701/48
2006/0206243 A1* 9/2006 Pawlicki et al. ................ 701/1
2007/0016339 A1* 1/2007 Patchell ......................... 701/1

* cited by examiner

VEHICLE DETECTOR AND VEHICLE DETECTING METHOD

BACKGROUND OF THE INVENTION

1. Field of the Invention

The present invention relates to vehicle detectors and vehicle detecting methods and in particular to a vehicle detector and a vehicle detecting method suitable for detecting another vehicle existing in the vicinity of a vehicle.

2. Description of the Related Art

A known vehicle-mounted driving aid apparatus determines the distance between a first vehicle on which the driving aid apparatus itself is mounted (hereinafter also referred to as a host vehicle) and a second vehicle ahead of or behind the first vehicle by detecting the second vehicle using a radar apparatus, so that, if the distance is too short, the driver of the first vehicle is warned or the speed of the first vehicle is restricted to avoid a collision (refer to, for example, Japanese Unexamined Patent Application Publication No. 2003-99762).

The radar apparatus used in such a driving aid apparatus receives reflected electromagnetic waves, such as microwaves or laser beams, emitted toward the second vehicle and detects the second vehicle based on the result of the received reflected waves.

More specifically, if radar reflection points in a radar pattern indicate a low speed relative to the host vehicle and form one group of many reflection points with intensities above a predetermined level, the group of reflection points is regarded as a vehicle, thus discriminating the vehicle from road noise.

However, since reflection points detected by the radar apparatus differ depending on, for example, the radar radiating position in the vehicle, the number of reflection points constituting the detected group is unreliably in some cases.

Furthermore, if a plurality of groups of reflection points exists such that the groups are close to one another, i.e., if the groups of reflection points are too close to one another, two vehicles are mistakenly regarded as one large vehicle.

Thus, the known vehicle-mounted driving aid apparatus has a problem that it is difficult to detect the second vehicle accurately and reliably.

SUMMARY OF THE INVENTION

The present invention has been conceived in light of these circumstances, and it is an object of the present invention to provide a vehicle detector and a vehicle detecting method for detecting another vehicle accurately and reliably and thereby reducing the incidence of traffic accidents.

According to one aspect of the present invention, a vehicle detector having a detecting apparatus for detecting at least part of an object as a detection point by receiving reflected electromagnetic waves repeatedly emitted to an area containing the object and capable of detecting another vehicle existing at least in the vicinity of a host vehicle based on a detection result of the detection point includes a determining apparatus. If a plurality of detection points detected by the detecting apparatus with one radiating operation forms one group of detection points in the form of an aggregate of a predetermined or larger number of detection points in a predetermined area, the determining apparatus determines that the group of detection points is likely to be one vehicle and sets a determining virtual window encompassing the group of detection points. If a change in the group of detection points with respect to a plurality of detection points obtained with a subsequent radiating operation is small, the determining apparatus determines that the group of detection points is more likely to be one vehicle. The determining apparatus repeats detection and determination for each radiating operation, and if a change in the group of detection points with respect to a plurality of detection points obtained with each radiating operation is small, determines that the group of detection points is much more likely to be one vehicle and repeats a subsequent radiating operation.

With this structure, the probability that the group of detection points is one vehicle can be increased by the determining apparatus based on the change in the group of detection points with respect to the determining virtual window, i.e., the state of movement of the group of detection points with respect to the determining virtual window.

In the vehicle detector, if a change in the number of detection points obtained with the subsequent radiating operation in the determining virtual window is equal to or less than a predetermined number, it may be determined that the group of detection points is more likely to be one vehicle, and the determining virtual window may be caused to move following a movement of the group of detection points in the determining virtual window.

With this structure, from the state of movement of the group of detection points with respect to the determining virtual window, it can be determined whether the group of detection points is likely to be one vehicle based on the number of detection points existing in an area encompassed by the determining virtual window after the group of detection points has moved.

In the vehicle detector, detection and determination may be repeated for each radiating operation, continuity of determination may be checked from a relationship between detection points obtained with each radiating operation and the determining virtual window, and it may be determined that the group of detection points is much more likely to be one vehicle and a subsequent radiating operation may be repeated if there is continuity in the determination.

With this structure, by repeating the detection of detection points and the determination as to whether the detected object corresponding to the group of detection points is likely to be one vehicle, the probability that the detected object corresponding to the group of detection points is one vehicle can further be increased.

In the vehicle detector, if a state of movement preventing a determination that the detected object corresponding to the group of detection points is likely to be one vehicle is indicated in a process of repeating the determination, the determining apparatus may maintain the determining virtual window at the current position instead of causing the determining virtual window to track the group of reflection points. If the state of movement is continued a predetermined or larger number of times, the determining apparatus may cancel the setting of the determining virtual window maintained at the current position. If the state of movement is eliminated before the predetermined number of times is reached and a state of movement allowing a determination that the detected object corresponding to the group of detection points is likely to be one vehicle is indicated again, the determining apparatus may cause the determining virtual window maintained at the current position to track the group of detection points again.

With this structure, even if a state of movement preventing the determination that the detected object corresponding to the group of detection points is likely to be one vehicle is indicated due to, for example, disturbance in contrast to an ideal state of movement of the group of detection points, a more accurate determination can be made as to the group of detection points since the indication of a state of movement allowing the determination that the detected object is likely to be one vehicle can be awaited a predetermined number of determination times.

In the vehicle detector, the determining apparatus may calculate a representative coordinate point in the group of detection points before the movement and a representative coordinate point in the group of detection points after the movement, and move the determining virtual window by the amount of movement of the representative coordinate point in the group of detection points after the movement relative to the representative coordinate point in the group of detection points before the movement to cause the determining virtual window to track the group of detection points.

With this structure, the determining virtual window is allowed to track the group of detection points reliably based on the amount of movement of the representative coordinate point in the group of detection points.

In the vehicle detector, the representative coordinate point may be a center of gravity in the group of detection points.

With this structure, the determining virtual window is allowed to track the group of detection points reliably based on the amount of movement of the center of gravity in the group of detection points.

In the vehicle detector, the determining apparatus may be capable of making an individual determination as to a plurality of groups of detection points different from one another.

With this structure, even though a plurality of groups of detection points that might be a plurality of other vehicles exists in the vicinity of the host vehicle, the groups of detection points can be detected individually and a determination as to the groups of detection points can be made individually.

According to another aspect of the present invention, a vehicle detecting method for detecting at least part of an object as a detection point by receiving reflected electromagnetic waves repeatedly emitted to an area containing the object to detect another vehicle existing at least in the vicinity of a host vehicle based on a detection result of the detection point includes steps of: determining that a group of a plurality of detection points detected with one radiating operation is likely to be one vehicle and setting a determining virtual window encompassing the group of detection points, if the plurality of detection points forms one group of detection points in the form of an aggregate of a predetermined or larger number of detection points in a predetermined area; determining that the group of detection points is more likely to be one vehicle if a change in the group of detection points with respect to a plurality of detection points obtained with a subsequent radiating operation is small; and repeating detection and determination for each radiating operation, and determining that the group of detection points is much more likely to be one vehicle and repeating a subsequent radiating operation if a change in the group of detection points with respect to a plurality of detection points obtained with each radiating operation is small.

With this method, the probability that the group of detection points is one vehicle can be increased based on the change in the group of detection points with respect to the determining virtual window, i.e., the state of movement of the group of detection points with respect to the determining virtual window.

In the vehicle detecting method, if a change in the number of detection points obtained with the subsequent radiating operation in the determining virtual window is equal to or less than a predetermined number, it may be determined that the group of detection points is more likely to be one vehicle and the determining virtual window may be caused to move following a movement of the group of detection points in the determining virtual window.

With this method, from the state of movement of the group of detection points with respect to the determining virtual window, it can be determined whether the group of detection points is likely to be one vehicle based on the number of detection points existing in an area encompassed by the determining virtual window after the group of detection points has moved.

In the vehicle detecting method, detection and determination may be repeated for each radiating operation, continuity of determination may be checked from a relationship between detection points obtained with each radiating operation and the determining virtual window, and it may be determined that the group of detection points is much more likely to be one vehicle and a subsequent radiating operation may be repeated if there is continuity in the determination.

With this method, by repeating the detection of detection points and the determination as to whether the detected object corresponding to the group of detection points is likely to be one vehicle, the probability that the detected object corresponding to the group of detection points is one vehicle can further be increased.

In the vehicle detecting method, if a state of movement preventing a determination that the detected object corresponding to the group of detection points is likely to be one vehicle is indicated in a process of repeating the determination, the determining virtual window may be maintained at the current position instead of causing the determining virtual window to track the group of detection points. If the state of movement is continued a predetermined or larger number of times, the setting of the determining virtual window maintained at the current position may be cancelled. If the state of movement is eliminated before the predetermined number of times is reached and a state of movement allowing a determination that the detected object corresponding to the group of detection points is likely to be one vehicle is indicated again, the determining virtual window maintained at the current position may be caused to track the group of detection points again.

With this method, even if a state of movement preventing the determination that the detected object corresponding to the group of detection points is likely to be one vehicle is indicated due to, for example, disturbance in contrast to an ideal state of movement of the group of detection points, a more accurate determination can be made as to the group of detection points since the indication of a state of movement allowing the determination that the detected object is likely to be one vehicle can be awaited a predetermined number of determination times.

In the vehicle detecting method, a representative coordinate point in the group of detection points before the movement and a representative coordinate point in the group of detection points after the movement may be calculated, and the determining virtual window may be moved by the amount of movement of the representative coordinate point in the group of detection points after the movement relative to the representative coordinate point in the group of detection points before the movement to cause the determining virtual window to track the group of detection points.

With this method, the determining virtual window is allowed to track the group of detection points reliably based on the amount of movement of the representative coordinate point in the group of detection points.

In the vehicle detecting method, the representative coordinate point may be a center of gravity in the group of detection points. With this method, the determining virtual window is allowed to track the group of detection points reliably based on the amount of movement of the center of gravity in the group of detection points.

In the vehicle detecting method, an individual determination may be made as to a plurality of groups of detection points different from one another.

With this method, even though a plurality of groups of detection points that might be a plurality of other vehicles exists in the vicinity of the host vehicle, the groups of detection points can be detected individually and a determination as to the groups of detection points can be made individually.

With the vehicle detector according to the present invention, the probability that the group of detection points is one vehicle can be increased by the determining apparatus based on the change in the group of detection points with respect to the determining virtual window, i.e., the state of movement of the group of detection points with respect to the determining virtual window. As a result, this vehicle detector can detect another vehicle accurately and reliably and thereby reduce the incidence of traffic accidents. By allowing another vehicle to be detected reliably as described above, even if a plurality of other vehicles exists such that the groups are close to one another, the other vehicles can be discriminated as individual vehicles.

Furthermore, with the vehicle detector according to the present invention, from the state of movement of the group of detection points with respect to the determining virtual window, it can be determined whether the group of detection points is likely to be one vehicle based on the number of detection points existing in an area encompassed by the determining virtual window after the group of detection points has moved. As a result, this vehicle detector can detect another vehicle more efficiently.

Furthermore, with the vehicle detector according to the present invention, by repeating the detection of detection points and the determination as to whether the detected object corresponding to the group of detection points is likely to be one vehicle, the probability that the detected object corresponding to the group of detection points is one vehicle can further be increased. As a result, this vehicle detector can detect another vehicle more accurately.

Furthermore, with the vehicle detector according to the present invention, even if a state of movement preventing the determination that the detected object corresponding to the group of detection points is likely to be one vehicle is indicated due to, for example, disturbance in contrast to an ideal state of movement of the group of detection points, a more accurate determination can be made as to the group of detection points since the indication of a state of movement allowing the determination that the detected object is likely to be one vehicle can be awaited a predetermined number of determination times. As a result, this vehicle detector can detect another vehicle more stably.

In addition, with the vehicle detector according to the present invention, the determining virtual window is allowed to track the group of detection points reliably based on the amount of movement of the representative coordinate point in the group of detection points. As a result, this vehicle detector can detect another vehicle more accurately.

Furthermore, with the vehicle detector according to the present invention, the determining virtual window is allowed to track the group of detection points reliably based on the amount of movement of the center of gravity in the group of detection points. As a result, this vehicle detector can detect another vehicle more efficiently.

In addition, with the vehicle detector according to the present invention, even though a plurality of groups of detection points that might be a plurality of other vehicles exists in the vicinity of the host vehicle, the groups of detection points can be detected individually and a determination as to the groups of detection points can be made individually. As a result, this vehicle detector can detect a plurality of other vehicles more efficiently.

Furthermore, with the vehicle detecting method according to the present invention, the probability that the group of detection points is one vehicle can be increased based on the change in the group of detection points with respect to the determining virtual window, i.e., the state of movement of the group of detection points with respect to the determining virtual window. As a result, this vehicle detecting method can detect another vehicle accurately and reliably and thereby reduce the incidence of traffic accidents.

Furthermore, with the vehicle detecting method according to the present invention, from the state of movement of the group of detection points with respect to the determining virtual window, it can be determined whether the group of detection points is likely to be one vehicle based on the number of detection points existing in an area encompassed by the determining virtual window after the group of detection points has moved. As a result, this vehicle detecting method can detect another vehicle more efficiently.

Furthermore, with the vehicle detecting method according to the present invention, by repeating the detection of detection points and the determination as to whether the detected object corresponding to the group of detection points is likely to be one vehicle, the probability that the detected object corresponding to the group of detection points is one vehicle can further be increased. As a result, this vehicle detecting method can detect another vehicle more accurately.

In addition, with the vehicle detecting method according to the present invention, even if a state of movement preventing the determination that the detected object corresponding to the group of detection points is likely to be one vehicle is indicated due to, for example, disturbance in contrast to an ideal state of movement of the group of detection points, a more accurate determination can be made as to the group of detection points since the indication of a state of movement allowing the determination that the detected object is likely to be one vehicle can be awaited a predetermined number of determination times. As a result, this vehicle detecting method can detect another vehicle more reliably.

Furthermore, with the vehicle detecting method according to the present invention, the determining virtual window is allowed to track the group of detection points reliably based on the amount of movement of the representative coordinate point in the group of detection points. As a result, this vehicle detecting method can detect another vehicle more accurately.

Furthermore, with the vehicle detecting method according to the present invention, the determining virtual window is allowed to track the group of detection points reliably based on the amount of movement of the center of gravity in the group of detection points. As a result, this vehicle detecting method can detect another vehicle more efficiently.

Furthermore, with the vehicle detecting method according to the present invention, even though a plurality of groups of detection points that might be a plurality of other vehicles exists in the vicinity of the host vehicle, the groups of detection points can be detected individually and a determination as to the groups of detection points can be made individually. As a result, this vehicle detecting method can detect a plurality of other vehicles more efficiently.

DESCRIPTION OF THE PREFERRED EMBODIMENTS

An embodiment of a vehicle detector according to the present invention will now be described with reference to FIGS. 1 to 4.

Figure 1:
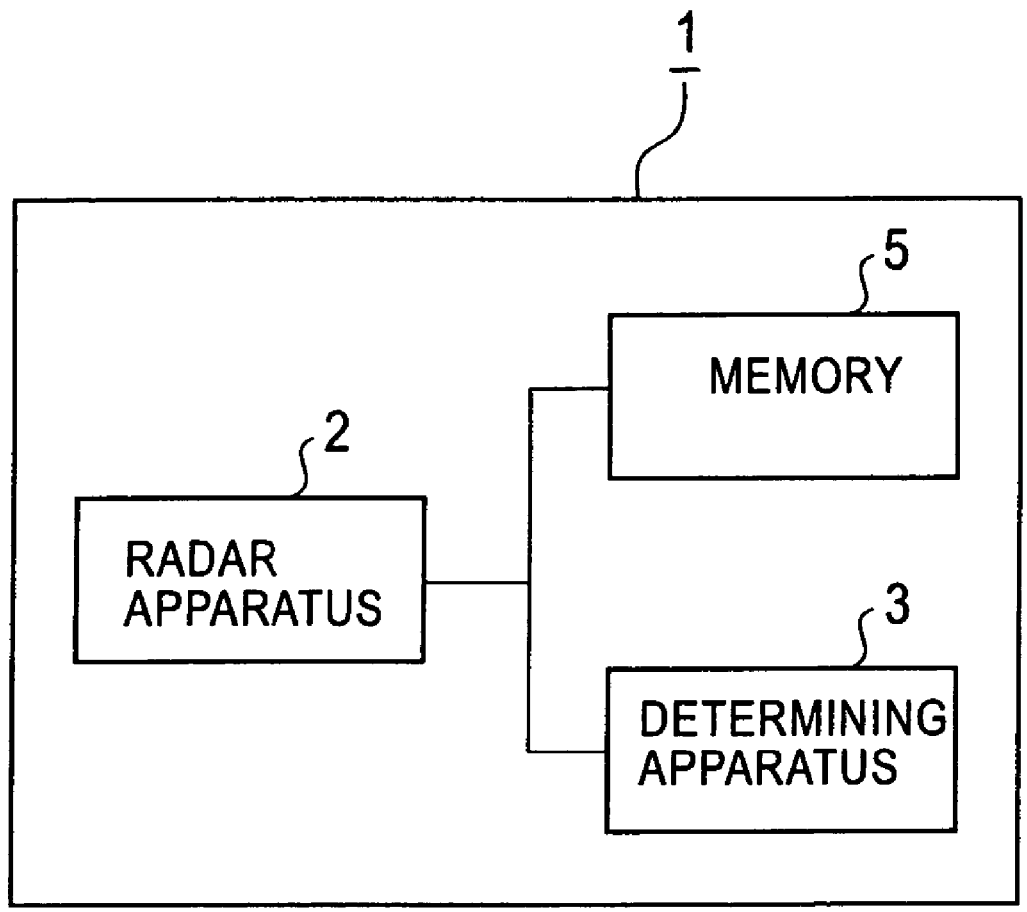
FIG. 1 is a block diagram depicting an embodiment of a vehicle detector according to the present invention.

Referring to FIG. 1, a vehicle detector 1 according to this embodiment is mounted in a host vehicle and includes a radar apparatus 2 as a detecting apparatus, which emits laser beams in desired directions (e.g., 360° around the host vehicle) at predetermined intervals for scanning. The radar apparatus 2 detects an object as a reflection point of laser beams, namely as a detection point, by receiving reflected light of the laser beams emitted toward the detected object. The radar apparatus 2 may use electromagnetic waves or laser beams depending on the intended detection distance, accuracy, etc., as long as the radar apparatus 2 can detect an object as a detection point.

The vehicle detector 1 according to this embodiment further includes a determining apparatus 3 composed of a CPU, etc. This determining apparatus 3 determines whether the object corresponding to the above-described reflection point detected by the radar apparatus 2 is likely to be one vehicle.

Figure 2:
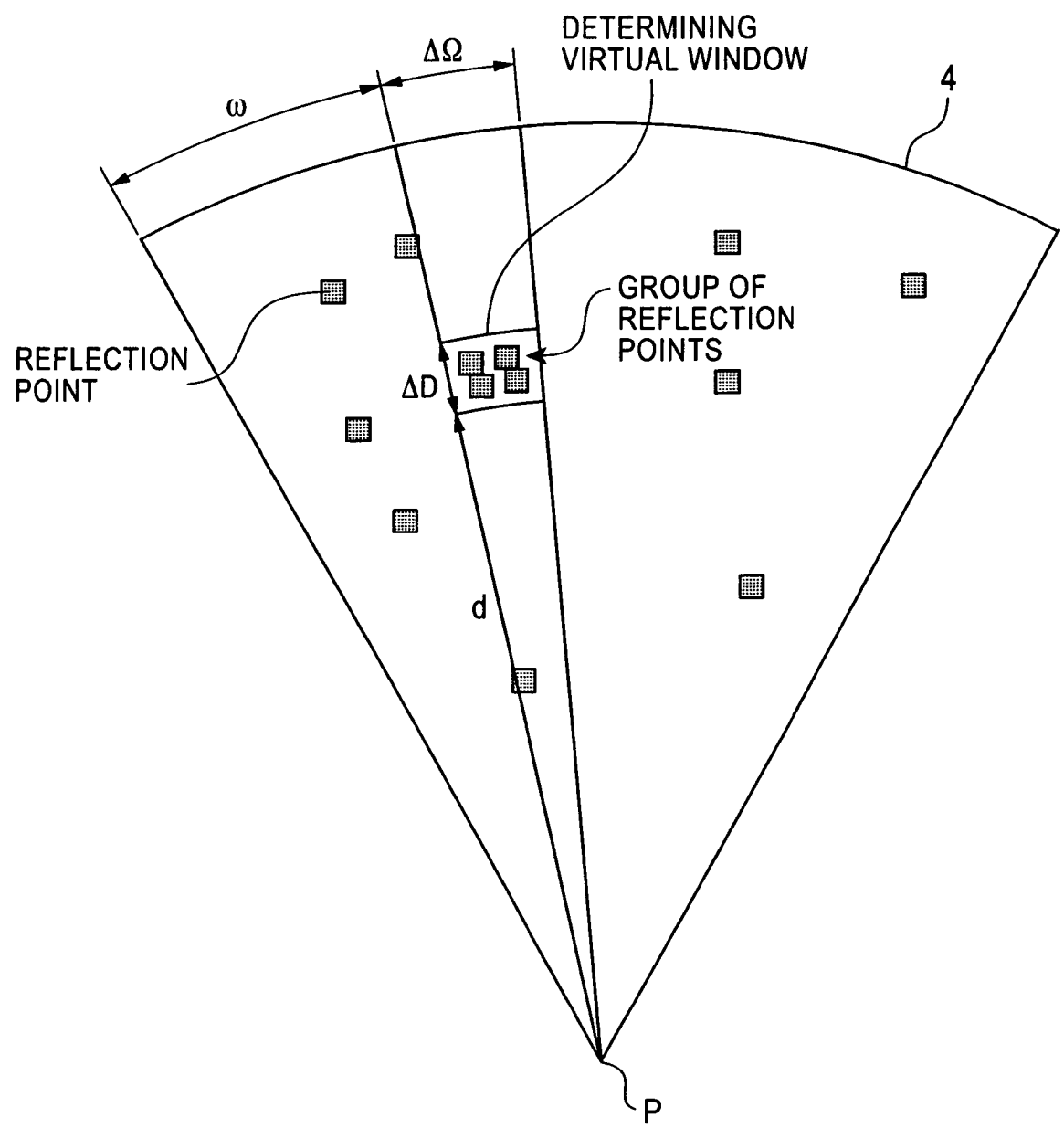
FIG. 2 a schematic diagram depicting reflection points in a scanning range of a radar apparatus in an embodiment of a vehicle detector according to the present invention.

More specifically, referring to FIG. 2, if a predetermined (four in FIG. 2) or larger number of reflection points detected as an aggregate in a fan-shaped scanning range 4, where the radar emission point is indicated by an origin P, form one group, the determining apparatus 3 sets a determining virtual window encompassing the group of reflection points.

As shown in FIG. 2, the determining virtual window according to this embodiment may be a virtual window defined by a predetermined angle range $\Delta\Omega$ and a distance range $\Delta D$ encompassed by four coordinate values ($\omega$, $x+\Delta\Omega$, d, $d+\Delta D$) in the scanning range 4.

Figure 3:
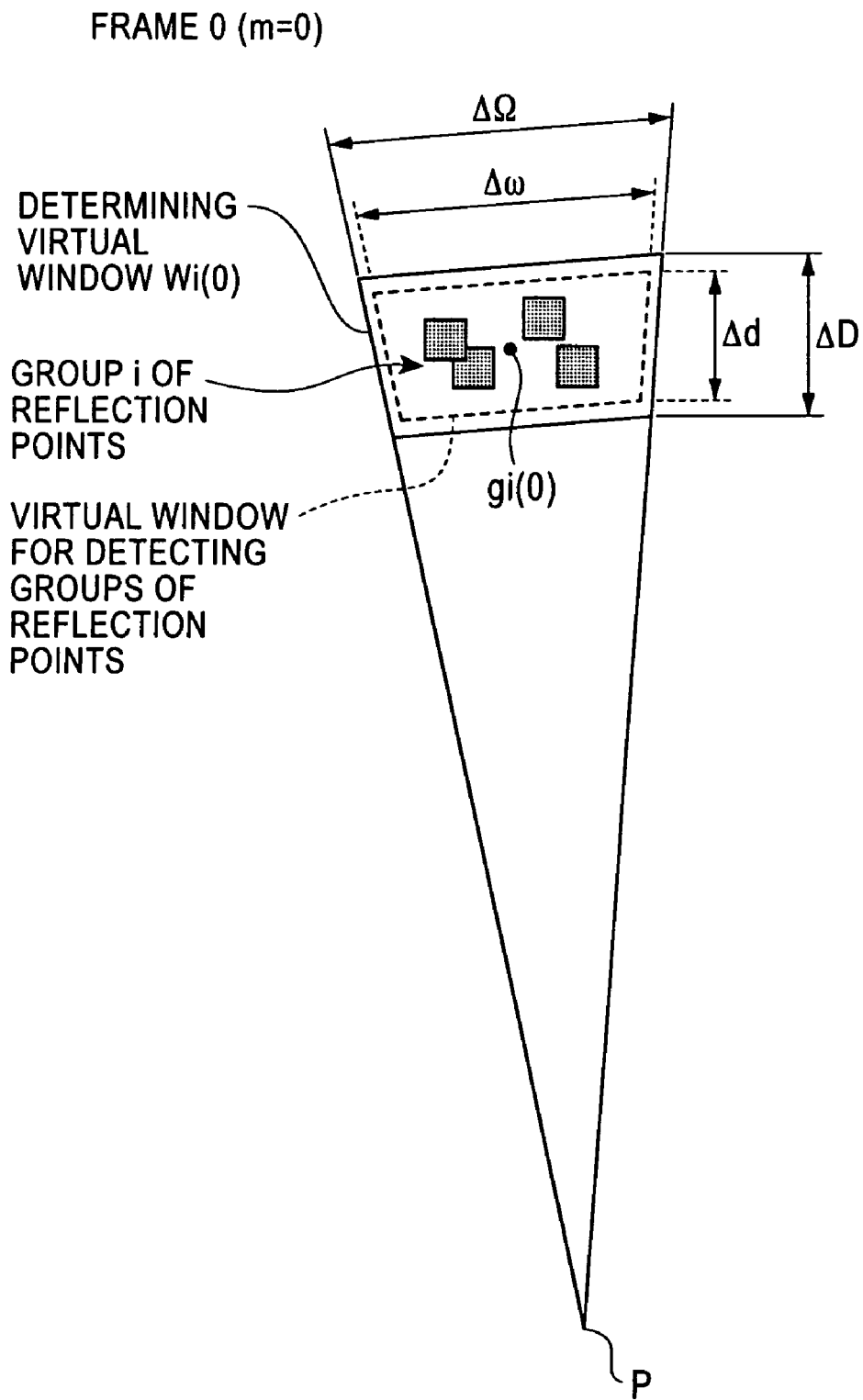
FIG. 3 is a schematic diagram depicting group i of reflection points and a determining virtual window for frame 0 in an embodiment of a vehicle detector according to the present invention.

Referring to FIG. 3, in order to detect the group of reflection points, the determining apparatus 3 scans a detecting virtual window defined by a predetermined angle range $\Delta\omega$ and a distance range $\Delta d$ in the scanning range 4. If a predetermined or larger number of the reflection points are detected in this virtual window for detecting groups of reflection points, the determining apparatus 3 sets these reflection points as group i of reflection points, and further sets the above-described determining virtual window outside this virtual window for detecting groups of reflection points according to a predetermined rule. If a plurality of groups of reflection points exists in the scanning range 4, subscripts i discriminate individual groups of reflection points.

The arrangement of reflection points in the scanning range 4 may change for each radar scan operation, i.e., for each scanning period, as the host vehicle and other vehicles move. The arrangement data of reflection points acquired through this unit scan operation is defined as a frame.

Furthermore, the frame when the determining virtual window is set after a group of reflection points has been detected in the virtual window for detecting groups of reflection points is defined as frame 0, and the determining virtual window at this time is defined as $W_i(0)$ (refer to FIG. 3).

The determining virtual window can be represented as follows using a function F ($\omega$, $\omega+\Delta\Omega$, d, $d+\Delta D$, m) with the four coordinate values ($\omega$, $\omega+\Delta\Omega$, d, $d+\Delta D$) and frame number m as variables. That is, $$W_i(m) = F(\omega, \omega+\Delta\Omega, d, d+\Delta D, m)$$

where i of $W_i$ is a subscript indicating the determining virtual window corresponding to group i of reflection points.

When determining virtual window $W_i(0)$ is set for frame 0 as described above, the determining apparatus 3 calculates the center of gravity $g_i(0)$ in group i of reflection points for frame 0 as a representative coordinate point in group i of reflection points for frame 0.

When determining virtual window $W_i(0)$ is set, the determining apparatus 3 determines that the detected object corresponding to group i of reflection points is likely to be one vehicle.

Figure 4:
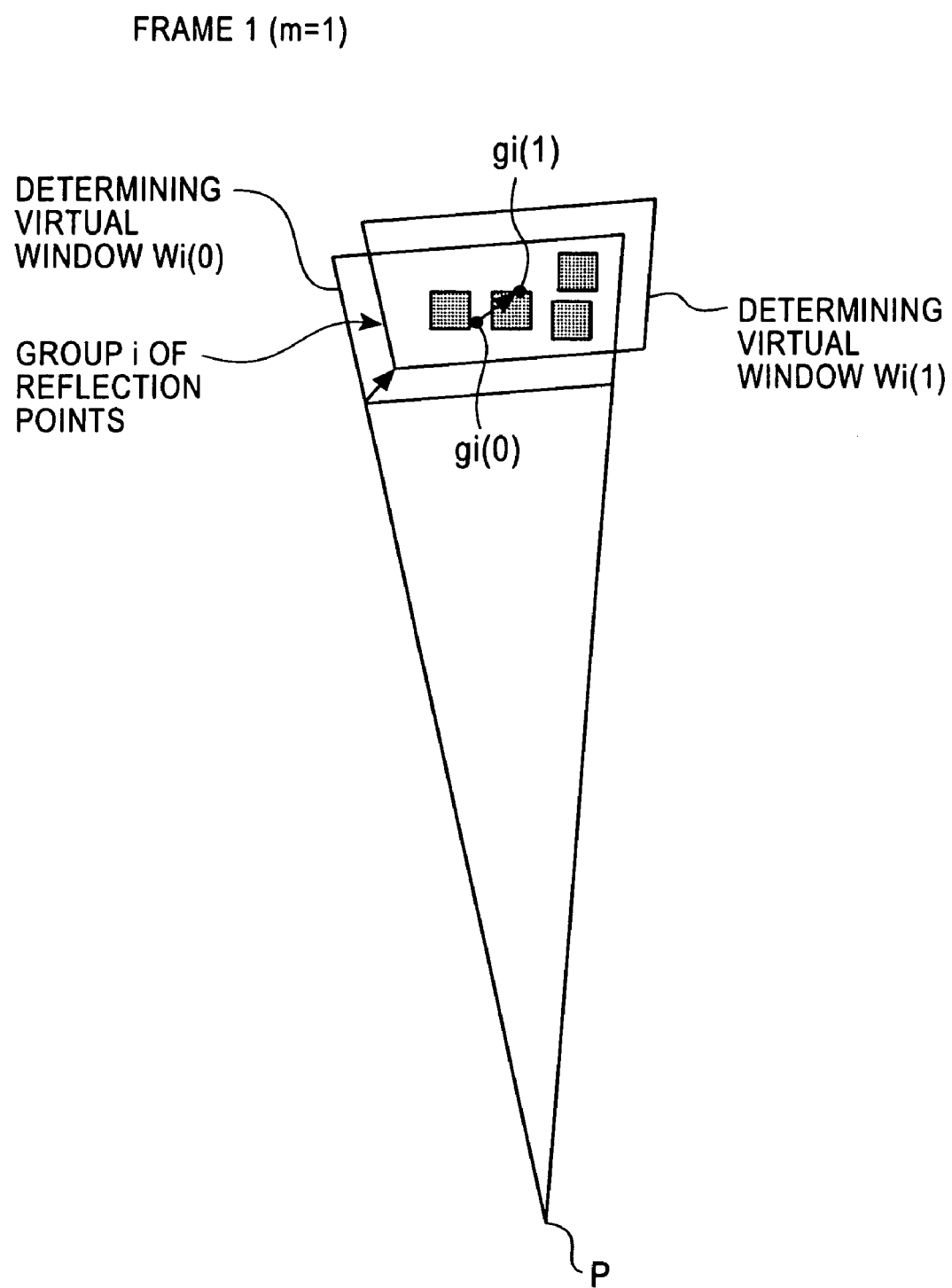
FIG. 4 is a schematic diagram depicting group i of reflection points and a determining virtual window for frame 1 in an embodiment of a vehicle detector according to the present invention.

Referring to FIG. 4, in frame 1 one scanning period after frame 0, the determining apparatus 3 determines whether group i of reflection points satisfies a condition of continuity defined below as an index for determining a state of movement of group i of reflection points relative to determining virtual window $W_i(0)$.

Condition of Continuity:

An absolute difference $|n_m - n_{m-1}|$ is defined as "continuity" if $|n_m - n_{m-1}| < \Delta n$ ($\Delta n$=predetermined number) is satisfied, where $n_m$ is the number of reflection points for current frame m in previous window $W_i(m-1)$ and $n_{m-1}$ is the number of reflection points for previous frame m−1 in previous window $W_i(m-1)$. This definition of continuity is described as follows at m=1. "Continuity" is applicable if the difference between the number $n_0$ (four in FIG. 2) of reflection points for frame 0 in window $W_i(0)$ and the number $n_1$ of reflection points for subsequent frame 1 in previous window $W_i(0)$ is equal to or below the predetermined number $\Delta n$.

If the state of movement of group i of reflection points satisfies the above-described condition of continuity, the determining apparatus 3 determines that the detected object corresponding to group i of reflection points is more likely to be one vehicle.

In short, the conclusion that group i of reflection points is one vehicle can be determined based on the state of movement of group i of reflection points relative to the determining virtual window. Furthermore, if the condition of continuity is satisfied in frame 1, the determining apparatus 3 re-calculates the center of gravity in group i of reflection points for the current frame (frame 1) in determining virtual window $W_i(0)$ for the previous frame (frame 0) to obtain $g_i(1)$.

The determining apparatus 3 then moves determining virtual window $W_i(0)$ by the amount of movement of the center of gravity $g_i(1)$ in group i of reflection points for frame 1 relative to the center of gravity $g_i(0)$ in group i of reflection points for frame 0. This moved determining virtual window $W_i(0)$ is newly set as determining virtual window $W_i(1)$ at the position after the movement. Along with the movement of group i of reflection points from frame 0 to frame 1, determining virtual window $W_i$ encompassing these reflection points is also allowed to track group i of reflection points from window $W_i(0)$ to window $W_i(1)$.

Furthermore, in frame 2 one scanning period after frame 1 and the subsequent frames, the determining apparatus 3 determines whether group i of reflection points for each frame satisfies the above-described condition of continuity with respect to group i of reflection points for the previous frame. The determining apparatus 3 then causes determining virtual window $W_i$ to track group i of reflection points satisfying the condition of continuity.

More specifically, assuming that k is an integer equal to or larger than 2, if group i of reflection points for frame k satisfies the condition of continuity, the determining apparatus 3 causes determining virtual window $W_i(k-1)$ for frame k−1 to track group i of reflection points for frame k to set determining virtual window $W_i(k-1)$ as new determining virtual window $W_i(k)$. Furthermore, this tracking of the determining virtual window is carried out by moving the determining virtual window by the amount of movement of the center of gravity $g_i(k)$ in group i of reflection points for frame k in determining virtual window $W_i(k-1)$ relative to the center of gravity $g_i(k-1)$ in group i of reflection points for frame k−1 in determining virtual window $W_i(k-2)$.

In this manner, the determination where the determining virtual window tracks group i of reflection points can be repeated two or more times for each scanning period (i.e., every frame). By repeating this determination as to group i of reflection points, the certainty that the detected object corresponding to the group of detection points is one vehicle can be increased.

Furthermore, if a state of movement preventing the determination that the detected object corresponding to group i of reflection points is likely to be one vehicle is indicated, namely, if group i of reflection points does not satisfy the condition of continuity, in the process of repeating the above-described determination, the determining apparatus 3 maintains the determining virtual window at the current position instead of causing the determining virtual window to track group i of reflection points. For example, if group i of reflection points does not satisfy the condition of continuity in frame 1, determining virtual window $W_i(0)$ set for frame 0 is maintained at the position of current frame 0 instead of tracking group i of reflection points for frame 1.

If a state in which group i of reflection points does not satisfy the condition of continuity is repeated the predetermined determination number or larger of times, i.e., over the predetermined number or larger of frames, the determining apparatus 3 cancels the setting of the determining virtual window maintained at the current position. In this case, it is assumed that a tentative conclusion that the detected object corresponding to group i of reflection points is not the one vehicle is obtained, and the tracking of group i of reflection points by the determining virtual window is completed.

On the other hand, if group i of reflection points satisfies the condition of continuity again before the state in which group i of reflection points does not satisfy the condition of continuity reaches the predetermined number of frames, the determining apparatus 3 causes the determining virtual window maintained at the current position to track group i of reflection points again.

For example, even if group i of reflection points does not satisfy the condition of continuity in frame 1, the tracking of group i of reflection points by the determining virtual window is resumed when group i of reflection points for subsequent frame 2 satisfies the condition of continuity again.

Therefore, even if a state in which the condition of continuity is not satisfied occurs due to, for example, disturbance in contrast to an ideal state of movement of group i of reflection points, a more accurate determination can be made as to group i of reflection points since the satisfaction of the condition of continuity can be awaited over a predetermined number of frames.

Furthermore, according to this embodiment, the determining apparatus 3 makes an individual determination as to a plurality of groups of reflection points different from one another. As a result, even though a plurality of groups i of reflection points that might be a plurality of other vehicles exists in the vicinity of the host vehicle, groups i of reflection points can be detected individually and a determination as to groups i of reflection points can be made individually.

In order to determine a plurality of groups i, j, and so on of reflection points, as described above, a plurality of determining virtual windows $W_i$, $W_j$ ... with different subscripts needs to be set for the same frame. In this case, areas encompassed by determining virtual windows $W_i$, $W_j$ ... may overlap each other.

In addition to the above-described structure, the vehicle detector 1 according to this embodiment further includes a memory 5. Calculation results and data required to determine group i of reflection points and to cause the determining virtual window to track group i of reflection points are recorded in and read from this memory 5.

An embodiment of a vehicle detecting method according to the present invention will now be described with reference to FIG. 5.

Figure 5:
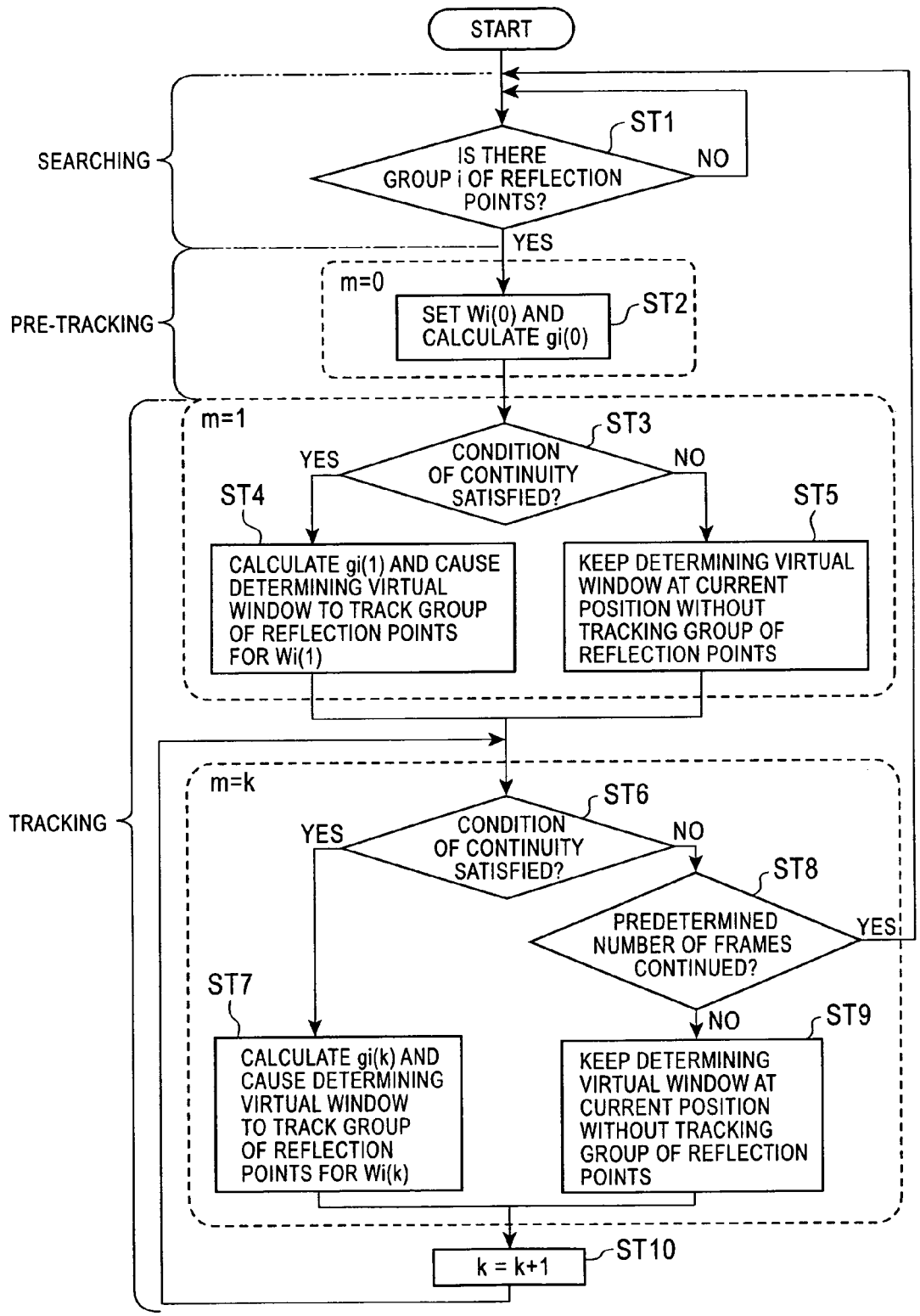
FIG. 5 is a flowchart illustrating an embodiment of a vehicle detecting method according to the present invention.

In this embodiment, after the detection of group i of reflection points in the scanning range 4 is started by driving the radar apparatus 2 for scanning, it is determined by the determining apparatus 3 in step 1 (ST1) of FIG. 5 whether group i of reflection points exists in the scanning range 4. In other words, it is determined whether the predetermined or larger number of reflection points has been detected in the detecting virtual window defined by the predetermined angle range $\Delta\omega$ and the distance range $\Delta d$ by scanning this virtual window for detecting groups of reflection points (searching).

If group i of reflection points exists in the scanning range 4 in step 1 (ST1), the flow proceeds to step 2 (ST2) of FIG. 5. If group i of reflection points does not exist, step 1 (ST1) is repeated.

The next step 2 (ST2) is a step for frame 0. In this step, pre-tracking starts to make preparations for the determination and tracking of detected group i of reflection points. In this step 2 (ST2), determining virtual window $W_i(0)$ encompassing group i of reflection points for frame 0 is set by the determining apparatus 3, and in addition, the center of gravity $g_i(0)$ in group i of reflection points for frame 0 is calculated.

The calculation result in step 2 (ST2) is temporarily recorded in the memory 5. Then, after determining virtual window $W_i(0)$ has been set and the center of gravity $g_i(0)$ in group i of reflection points for frame 0 has been calculated, the flow proceeds to step 3 (ST3) of FIG. 5.

Step 3 (ST3) to step 5 (ST5) are steps for frame 1. The tracking of group i of reflection points is carried out in each step. More specifically, it is determined in step 3 (ST3) whether group i of reflection points for frame 1 satisfies the condition of continuity, i.e., whether the absolute difference $|n_1-n_0|$ between the number $n_0$ of reflection points for frame 0 in window $W_i(0)$ and the number $n_1$ of reflection points for the subsequent frame 1 in previous window $W_i(0)$ is equal to or below the predetermined number $\Delta n$. If the condition of continuity is satisfied, the flow proceeds to step 4 (ST4). If the condition of continuity is not satisfied, the flow proceeds to step 5 (ST5).

In step 4 (ST4), the setting of determining virtual window $W_i(0)$ for frame 0 is read from the memory 5 by the determining apparatus 3, and the center of gravity $g_i(1)$ in group i of reflection points for the current frames (frame 1) in this determining virtual window $W_i(0)$ is calculated. In addition, the center of gravity $g_i(0)$ in group i of reflection points for frame 0 is read from the memory 5 by the determining apparatus 3. The determining virtual window is moved by the amount of the movement of $g_i(1)$ relative to $g_i(0)$ to set the determining virtual window as new determining virtual window $W_i(1)$. In this manner, the determining virtual window tracks group i of reflection points.

The calculation result in step 4 (ST4) is temporarily recorded in the memory 5. After the tracking of group i of reflection points for frame 1 by the determining virtual window is completed, the flow proceeds to step 6 (ST6).

On the other hand, in step 5 (ST5), the determining virtual window is maintained at the current position, namely, in frame 0, instead of tracking group i of reflection points for frame 1, and then the flow proceeds to step 6 (ST6). In step 5 (ST5), $W_i(1)=W_i(0)$ and $g_i(1)=g_i(0)$. The calculation result in step 5 (ST5) is temporarily recorded in the memory 5.

Step 6 (ST6) to step 9 (ST9) are steps for frame k.

First, it is determined in step 6 (ST6) whether group i of reflection points for frame k satisfies the condition of continuity. If the condition of continuity is satisfied, the flow proceeds to step 7 (ST7). If it is not satisfied, the flow proceeds to step 8 (ST8).

In step 7 (ST7), the setting of determining virtual window $W_i(k-1)$ for frame k-1 is read from the memory 5 by the determining apparatus 3 to calculate the center of gravity $g_i(k)$ in group i of reflection points for the current frame (frame k) in this determining virtual window $W_i(k-1)$. In addition, the center of gravity $g_i(k-1)$ in group i of reflection points for frame k 1 is read from the memory 5, and the determining virtual window is moved by the amount of the movement of $g_i(k)$ relative to $g_i(k-1)$ to set determining virtual window $W_i(k-1)$ as new determining virtual window $W_i(k)$, thus causing the determining virtual window to track group i of reflection points.

The calculation result in step 7 (ST7) is temporarily recorded in the memory 5. After the tracking of group i of reflection points for frame k by the determining virtual window is completed, the flow proceeds to step 10 (ST10).

On the other hand, in step 8(ST8), it is determined by the determining apparatus 3 whether a state in which group i of reflection points does not satisfy the condition of continuity is continued over the predetermined number of frames.

If a state in which group i of reflection points does not satisfy the condition of continuity is continued over the predetermined number of frames in step 8 (ST8), setting of the determining virtual window is cancelled, and the flow returns to step 1 (ST1). In this case, group i of reflection points is assumed not to be one vehicle, and the tracking of this group i of reflection points by the determining virtual window is terminated. Thereafter, new group i of reflection points is detected in the scanning range 4.

In contrast, if a state in which group i of reflection points does not satisfy the condition of continuity does not reach the predetermined number of frames in step 8 (ST8), the flow proceeds to step 9 (ST9).

In step 9 (ST9), the determining virtual window is maintained at its current position, namely, frame k-1, instead of causing the determining virtual window to track group i of reflection points for frame k. Thereafter, the flow proceeds to step 10 (ST10). In step 9 (ST9), $W_i(k)=W_i(k-1)$ and $g_i(k)=g_i(k-1)$. The calculation result in step 9 (ST9) is temporarily recorded in the memory 5.

Next, in step 10 (ST10), the number of frames is incremented and the processing in step 6 (ST6) and the subsequent processing are repeated.

The same processing as described above is conducted for searching for, pre-tracking, and tracking a plurality of groups i, j . . . of reflection points, so that each group of reflection points is subjected to the same processing. It should be noted, however, that a cross-check must be carried out so that no two processing flows are involved in the same group of reflection points.

As described above, according to this embodiment, it can be determined whether group i of reflection points is likely to be one vehicle based on whether group i of reflection points satisfies the condition of continuity. As a result, other vehicles can be detected accurately and reliably.

The present invention is not limited to the above-described embodiments, but various modifications are conceivable as required.

For example, in order to determine the state of movement of a group of reflection points relative to the determining detection window, the speed and intensity of the group of reflection points relative to the host vehicle may be provided in addition to the above-described condition of continuity. By doing so, it can be determined more accurately whether the detected object corresponding to a group of reflection points is likely to be one vehicle.

Furthermore, although the center of gravity is used as a representative coordinate point in a group of detection points in the above-described embodiments, a simple mean value may be used alternatively. In addition, the maximum value and minimum value of a group on the coordinate axis may be used to predict movement based on changes in the maximum value and minimum value. In short, any representative coordinate point in a group of detection points may be adopted as long as it allows movement to be predicted.

In the above-described embodiments, if a determination of "continuity" is not made, $W_i(k)=W_i(k-1)$ and $g_i(k)=g_i(k-1)$. $W_i(k)$ may be set using a higher level of calculation. More specifically, the amount of movement may be predicted based on the amount of movement from $W_i(k-2)$ to $W_i(k-1)$ or in relation to the history of previous movements. Furthermore, the center of gravity may be predicted for $g_i(k)$ based on the amount of change from $g_i(k-2)$ to $g_i(k-1)$ or in relation to the history of previous changes.

In the above-described embodiments, it is assumed that the magnitude of $W_i$ is constant once it is set. The magnitude of $W_i$ may be changed according to the history of magnitudes, such as cumulative mean values, weighted averages with less weights applied to older magnitudes, after abrupt changes in magnitude in a group of reflection points have been eliminated.

In the above-described embodiments, the detection of the center of gravity is carried out by calculating the center of gravity $g_i(k)$ in group i of reflection points for the current frame (frame k) in determining virtual window $W_i(k-1)$. In order to further increase the accuracy, $g_i(k)$ may be obtained as described below. That is to say, the center of gravity $g_i$ in group i of reflection points for the current frame (frame k) in determining virtual window $W_i(k-1)$ is calculated, the determining virtual window is moved by the amount of movement of $g_i$ relative to $g_i(k-1)$ for determining virtual window $W_i(k)$, and the center of gravity in group i of reflection points for the current frame (frame k) in this determining virtual window $W_i(k)$ is re-calculated for $g_i(k)$.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle detecting method arranged to detect another vehicle existing in the vicinity of a host vehicle, the vehicle detecting method comprising:

repeatedly radiating electromagnetic waves from the host vehicle in a predetermined range;

detecting at least part of an object as a detection point by receiving electromagnetic waves reflected by the object in the predetermined range;

determining that a group of a plurality of detection points detected with one radiating operation is a candidate to be a vehicle and setting a determining virtual window encompassing the group of detection points, if the group of detection points includes a predetermined or larger number of detection points in a predetermined area;

determining that the group of detection points is still a candidate to be a vehicle if a change in the group of detection points with respect to a plurality of detection points obtained with a subsequent radiating operation is small;

repeating detection and determination for each radiating operation, and determining that the group of detection points is still a candidate to be a vehicle if a change in the group of detection points with respect to a plurality of detection points obtained with each successive radiating operation remains small; and if a change in the group of detection points with respect to a plurality of detection points obtained with the subsequent radiating operation is small, causing the determining virtual window to move following a movement of the group of detection points in the determining virtual window, where a representative coordinate point in the group of detection points before the movement and a representative coordinate point in the group of detection points after the movement are calculated, and the determining virtual window is moved by the amount of movement of the representative coordinate point in the group of detection points after the movement relative to the representative coordinate point in the group of detection points before the movement to cause the determining virtual window to track the group of detection points.

2. The vehicle detecting method according to claim 1, arranged so that if a change in the number of detection points obtained with the subsequent radiating operation in the determining virtual window is equal to or less than a predetermined number, it is determined that the group of detection points is still a candidate to be a vehicle and the determining virtual window is caused to move following a movement of the group of detection points in the determining virtual window.

3. The vehicle detecting method according to claim 2, arranged so that detection and determination are repeated for each radiating operation, continuity of determination is checked from a relationship between detection points obtained with each radiating operation and the determining virtual window, and it is determined that the group of detection points is still a candidate to be a vehicle and a subsequent radiating operation is repeated if there is continuity in the determination.

4. The vehicle detecting method according to claim 3, arranged so that a speed and an intensity of the group of reflection points relative to the host vehicle are provided in addition to a condition of the continuity to determine a state of movement of the group of reflection points relative to the determining virtual window.

5. The vehicle detecting method according to claim 1, arranged so that the representative coordinate point is a center of gravity in the group of detection points.

6. The vehicle detecting method according to claim 1, arranged so that if a state of movement of the group of detection points preventing a determination that the detected object corresponding to the group of detection points is a candidate to be a vehicle is indicated in a process of repeating the determination, the determining virtual window is maintained at the current position instead of causing the determining virtual window to track the group of reflection points, if the state of movement is continued a predetermined or larger number of times of the radiating operation, the setting of the determining virtual window maintained at the current position is cancelled, and if the state of movement is eliminated before the predetermined number of times of the radiating operation is reached and a state of movement of the group of detection points allowing a determination that the detected object corresponding to the group of detection points is a candidate to be a vehicle is indicated again, the determining virtual window maintained at the current position is caused to track the group of detection points again.

7. The vehicle detecting method according to claim 1, arranged so that the method is conducted for each of a plurality of different groups of detection points.

8. The vehicle detecting method according to claim 1, arranged so that the object is detected with a radar apparatus.

9. The vehicle detecting method according to claim 8, arranged so that the radar apparatus emits laser beams at predetermined intervals in a desired direction.

10. A vehicle detecting method arranged to detect another vehicle existing in the vicinity of a host vehicle, the vehicle detecting method comprising:

repeatedly radiating electromagnetic waves from the host vehicle in a predetermined range;

detecting at least part of an object as a detection point by receiving electromagnetic waves reflected by the object in the predetermined range;

determining that a group of a plurality of detection points detected with one radiating operation is a candidate to be a vehicle and setting a determining virtual window encompassing the group of detection points, if the group of detection points includes a predetermined or larger number of detection points in a predetermined area;

determining that the group of detection points is still a candidate to be a vehicle if a change in the group of detection points with respect to a plurality of detection points obtained with a subsequent radiating operation is equal to or below a predetermined number; and if a change in the number of detection points obtained with the subsequent radiating operation in the determining virtual window is equal to or less than the predetermined number, causing the determining virtual window to move following a movement of the group of detection points in the determining virtual window.

11. The vehicle detecting method according to claim 10, further comprising:

repeating detection and determination for each radiating operation, and determining that the group of detection points is still a candidate to be a vehicle if a change in the group of detection points with respect to a plurality of detection points obtained with each successive radiating operation remains equal to or below the predetermined number.

12. The vehicle detecting method according to claim 10, arranged so that detection and determination are repeated for each radiating operation, continuity of determination is checked from a relationship between detection points obtained with each radiating operation and the determining virtual window, and it is determined that the group of detection points is still a candidate to be a vehicle and a subsequent radiating operation is repeated if there is continuity in the determination.

13. The vehicle detecting method according to claim 12, arranged so that a speed and an intensity of the group of reflection points relative to the host vehicle are provided in addition to a condition of the continuity to determine a state of movement of the group of reflection points relative to the determining virtual window.

14. The vehicle detecting method according to claim 10, arranged so that a representative coordinate point in the group of detection points before the movement and a representative coordinate point in the group of detection points after the movement are calculated, and the determining virtual window is moved by the amount of movement of the representative coordinate point in the group of detection points after the movement relative to the representative coordinate point in the group of detection points before the movement to cause the determining virtual window to track the group of detection points.

15. The vehicle detecting method according to claim 14, arranged so that the representative coordinate point is a center of gravity in the group of detection points.

16. The vehicle detecting method according to claim 10, arranged so that if a state of movement of the group of detection points preventing a determination that the detected object corresponding to the group of detection points is a candidate to be a vehicle is indicated in a process of repeating the determination, the determining virtual window is maintained at the current position instead of causing the determining virtual window to track the group of reflection points, if the state of movement is continued a predetermined or larger number of times of the radiating operation, the setting of the determining virtual window maintained at the current position is cancelled, and if the state of movement is eliminated before the predetermined number of times of the radiating operation is reached and a state of movement of the group of detection points allowing a determination that the detected object corresponding to the group of detection points is a candidate to be a vehicle is indicated again, the determining virtual window maintained at the current position is caused to track the group of detection points again.

17. The vehicle detecting method according to claim 10, arranged so that the method is conducted for each of a plurality of different groups of detection points.

18. The vehicle detecting method according to claim 10, arranged so that the object is detected with a radar apparatus.

19. The vehicle detecting method according to claim 18, arranged so that the radar apparatus emits laser beams at predetermined intervals in a desired direction.

* * * * *